Figures 1, 2:
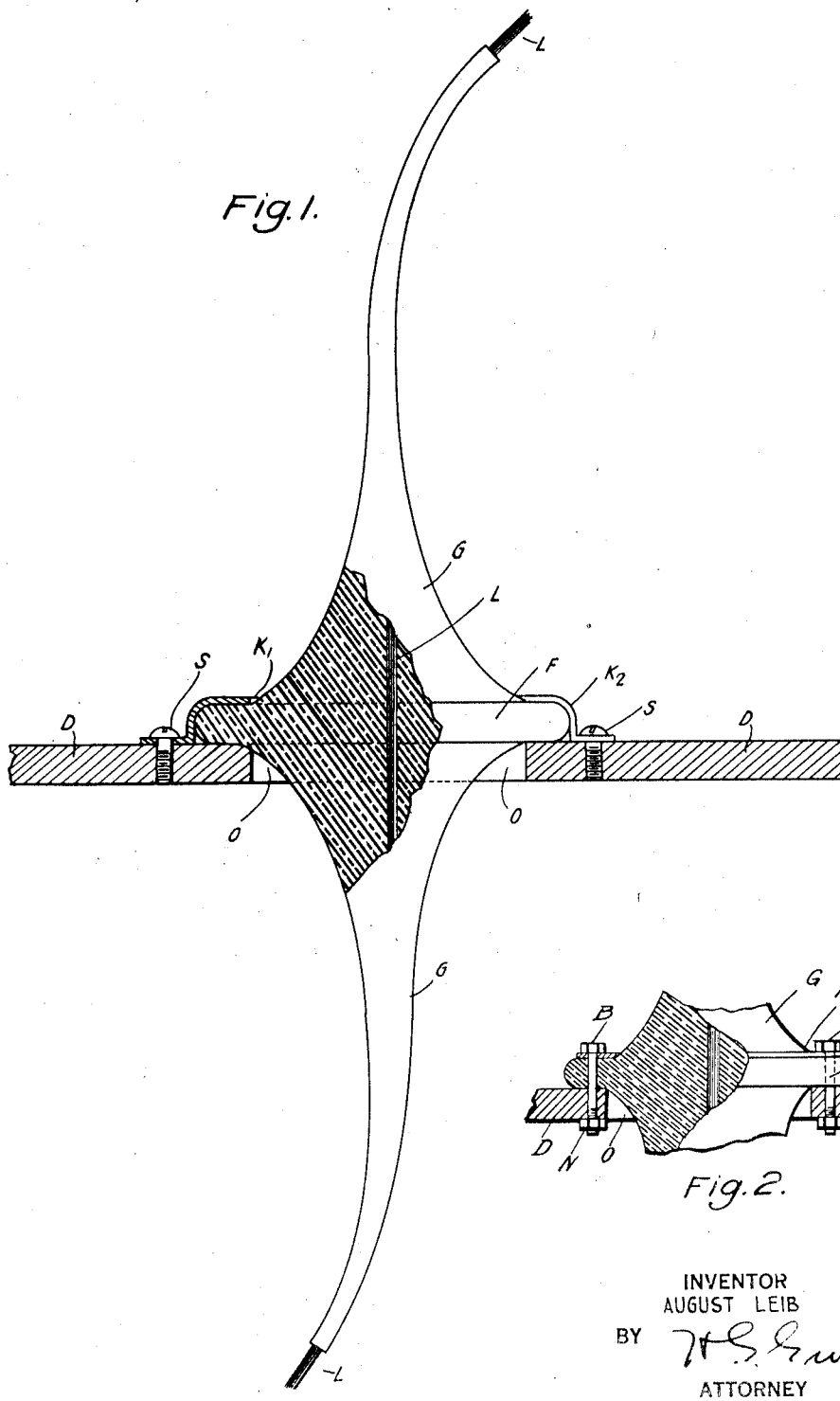

April 24, 1934. A. LEIB 1,956,357
FLEXIBLE INSULATED CONDUCTOR
Filed Feb. 9, 1931

INVENTOR
AUGUST LEIB
BY
ATTORNEY

Patented Apr. 24, 1934

1,956,357

UNITED STATES PATENT OFFICE 1,956,357

FLEXIBLE INSULATED CONDUCTOR

August Leib, Berlin, Germany, assignor to Telefunken Gesellschaft fur Drahtlose Telegraphie m. b. H., Berlin, Germany, a corporation of Germany Application February 9, 1931, Serial No. 514,385
In Germany February 8, 1930

5 Claims. (Cl. 173—311)

The present invention is related to a simple and advantageous mode of manufacture of the insulating jacket of a lead-in conductor whereby the employment of a distinct leading-through bush or duct is made dispensable.

According to this invention the insulation sheath in the case of a conductor having an elastic or flexible insulation sheath pressed around it, is provided with a flange-like enlargement which serves for the securing thereof onto the duct or lead-through opening.

In the drawing Fig. 1 shows an elevation of the lead-in insulator with the securing means shown partly in section. Fig. 2 is a partial view of the lead-in insulator showing another modification of the securing means which is shown partly in section.

Referring now to Fig. 1 which is merely illustrative of one form of the invention, a flexible conductor L, say, a stranded wire which is embedded or contained inside an elastic insulator G, serves as the conductor. The insulator is furnished with a flange-like enlargement F which in some suitable manner, say, a pressure or clamp or flanged ring $K_1$ having a form as indicated, conjointly with screws S, is attached onto the metallic member D or board having located thereon the leading-in opening or seal O. In the other modification of the securing means as shown in Fig. 2, there is provided a clamp ring $K_2$ having suitable bolts B and nuts N which pass through the mass of the insulator.

The advantages offered by this arrangement reside in providing a non-frangibility, yieldingness, simple insulated lead-in conductor which is cheap to manufacture, and further, has good securing as well as perfect tightening means.

Having thus described my invention and the operation thereof, what I claim is:

1. A connector comprising a flexible insulating member having an enlarged central portion, a flange securing member integral with said central portion, and a flexible conductor embedded in said member.

2. A flexible lead-in element comprising an elongated flexible insulating member having an enlarged central portion, and reduced end portions, a flange integral with said enlarged portion, said member being adapted to be passed through an opening and retained therein by said flange and a flexible conductor embedded in said member.

3. In combination, a flexible conductor composed of a plurality of yieldable wires embedded within an elastic insulator, said elastic insulator being enlarged and having a flange-like enlargement intermediate its ends for mounting, said ends being formed by converging the elastic insulator material from said flange to said ends, the said flexible conductor emerging from said ends of the flexible insulator.

4. The combination of a flexible conductor having flexible insulation moulded around said conductor, the thickness of each end of said insulator increasing in external diameter toward a central enlargement forming a flange, said flange having a plurality of apertures for securing screws to retain said insulator in place.

5. The combination of a flexible conductor having flexible insulation moulded around said conductor the thickness of each end of said insulator increasing in external diameter toward a central enlargement forming a flange, said flange cooperating with a clamping ring to secure said insulator in place.

AUGUST LEIB.